United States Patent [19]

Bes

[11] 4,353,447

[45] Oct. 12, 1982

[54] CYCLE FREEWHEEL ASSEMBLY AND CYCLE WHEEL THEREFOR

[76] Inventor: Francis Bes, 36, rue Sere de Rivieres, Albi (Tarn), France

[21] Appl. No.: 85,805

[22] Filed: Oct. 17, 1979

[30] Foreign Application Priority Data

Oct. 3, 1979 [FR] France .................................. 79 24649

[51] Int. Cl.³ .......................................... F16D 41/30
[52] U.S. Cl. ................................................... 192/64
[58] Field of Search ................ 192/64, 46; 301/105 B; 474/902, 78

[56] References Cited

U.S. PATENT DOCUMENTS

| | | | |
|---|---|---|---|
| 4,154,123 | 5/1979 | Nagano .............................. | 192/64 X |
| 4,226,317 | 10/1980 | Nagano et al. ........................ | 192/64 |
| 4,230,212 | 10/1980 | Tsuchie et al. ......................... | 192/64 |

FOREIGN PATENT DOCUMENTS

| | | | |
|---|---|---|---|
| 449475 | 6/1949 | Italy ....................................... | 192/64 |
| 35422 | 5/1935 | Netherlands ........................... | 192/64 |
| 974586 | 11/1964 | United Kingdom ................ | 474/902 |

*Primary Examiner*—Rodney H. Bonck
*Attorney, Agent, or Firm*—Wolf, Greenfield & Sacks

[57] ABSTRACT

A cycle wheel assembly comprises a hub member on which a gear assembly is rotatably carried, with pawls being operatively disposed between the gear assembly and the hub member for freewheel drive of the assembly. The opening in the assembly has splines which are slightly inclined or which extend longitudinally, with respect to the axis of the hub member, for drivingly fitting the freewheel assembly on a suitable cycle wheel hub.

6 Claims, 3 Drawing Figures

Fig.1
PRIOR ART
Fig.2
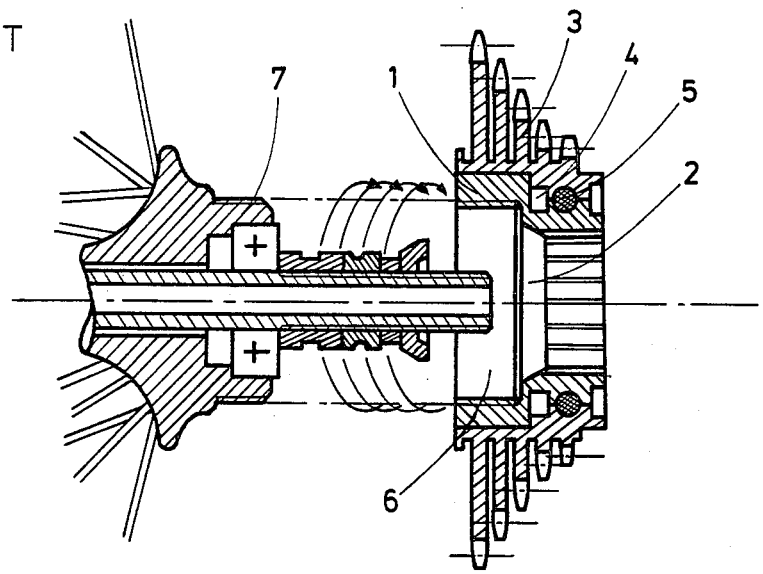
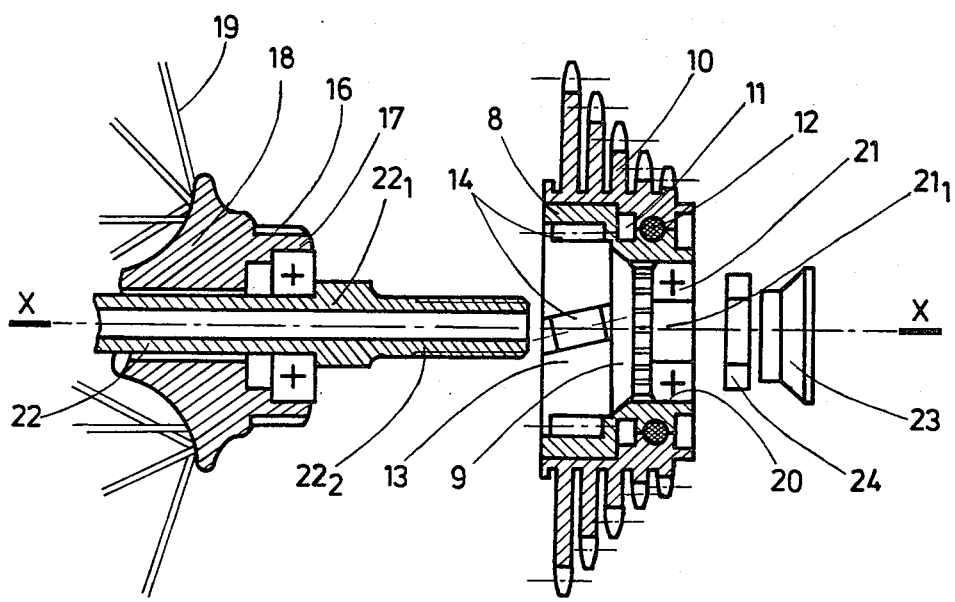

CYCLE FREEWHEEL ASSEMBLY AND CYCLE WHEEL THEREFOR

BACKGROUND OF THE INVENTION

In most prior art cycle freewheels, the freewheel assembly comprises a hub member or boss which is secured onto a suitable part of the hub of the cycle wheel. The hub member of the freewheel assembly has an axial opening bearing the internal screwthread adapted to co-operate with the wheel hub, while the hub member rotatably carries a gear or pinion arrangement comprising one or more gears. At least one pawl is disposed between the hub member and the rotatable gear arrangement, to provide the freewheel drive action.

However, because the screwthread for fixing the freewheel assembly on the wheel hub is of fine pitch, and because the direction of the drive force applied to the freewheel assembly tends to tighten the freewheel hub member on the wheel hub, it is a difficult and delicate operation to remove this freewheel assembly from the wheel hub and generally requires the use of a vice, and a suitable remover for removing the freewheel assembly. Further, a specific freewheel removal tool is usually required to remove each type of freewheel assembly, because of the differences in the structure and the dimensions of the various freewheel assemblies available on the market.

Moreover, the operation of removing the freewheel assembly runs the risk of damaging the spindle of the wheel hub for example because the freewheel remover often tends to jump out of the lugs with which it is engaged on the freewheel assembly.

SUMMARY OF THE INVENTION

An object of the invention is to provide a cycle wheel freewheel assembly which remedies the above-indicated disadvantages and shortcomings of the foregoing prior-art assembly.

Yet another object of the invention is to provide a freewheel assembly which can be easily fitted to and removed from a cycle wheel, without requiring the use of special fitting and removal tools.

A still further object of the present invention is to provide a cycle freewheel assembly which does not tend to tighten upon the cycle wheel hub, under the normal forces applied thereto in operation.

A yet further object of the invention is to provide a cycle wheel freewheel assembly such that the distance between the spoke-mounting flange on the wheel hub, at the freewheel assembly side of the wheel hub, and the wheel mounting lug of the rear fork of the cycle frame, can be reduced, thereby to reduce the overhang and thereby to shoften the unsupported length of wheel spindle between the wheel hub and the wheel mounting lug.

Yet a further object of the invention is to provide a cycle wheel freewheel assembly in which drive to the freewheel assembly by the drive chain tends to cause the freewheel assembly to be more firmly fixed on the cycle wheel hub, without however the firmer fixing causing the cycle freewheel assembly to be even more difficult to remove.

Another object of the invention is a cycle wheel, for use in conjunction with the freewheel assembly of the invention.

These and other objects are achieved by a cycle wheel freewheel assembly comprising a hub member having an axial opening, with a spline arrangement on the radially inwardly facing surface of the hub member, adapted to co-operate with a corresponding spline arrangement on a cylindrical outside surface of the cycle wheel hub. The spline arrangement comprises splines which are slightly inclined or which extend longitudinally, with respect to the axis of the freewheel assembly hub member. The hub member may further carry a bearing assembly such as a ball bearing assembly by means of which the hub member is supported against a shoulder on the spindle of the cycle wheel hub, thereby to carry forces acting on the freewheel assembly hub member in the axial direction thereof. The hub member of the freewheel assembly may additionally be fixed on the cycle wheel hub by means of a screw-threaded ring or nut which however can be easily removed for the purposes of removing the freewheel assembly from the wheel hub. The pitch of the screwthread on the nut or ring for fixing the freewheel assembly on the wheel hub is preferably reversed with respect to the direction of inclination of the above-mentioned spline arrangement, whereby there is no tendency for the securing ring or nut to tighten up, in normal operation of the freewheel assembly and the cycle wheel provided therewith.

BRIEF DESCRIPTION OF THE DRAWINGS

FIG. 1 is a view in axial section of part of a prior-art freewheel assembly,

FIG. 2 is a corresponding view of part of a freewheel assembly according to the invention, together with the cycle wheel on which it is fitted.

DESCRIPTION OF THE PREFERRED EMBODIMENTS

Figure 3:
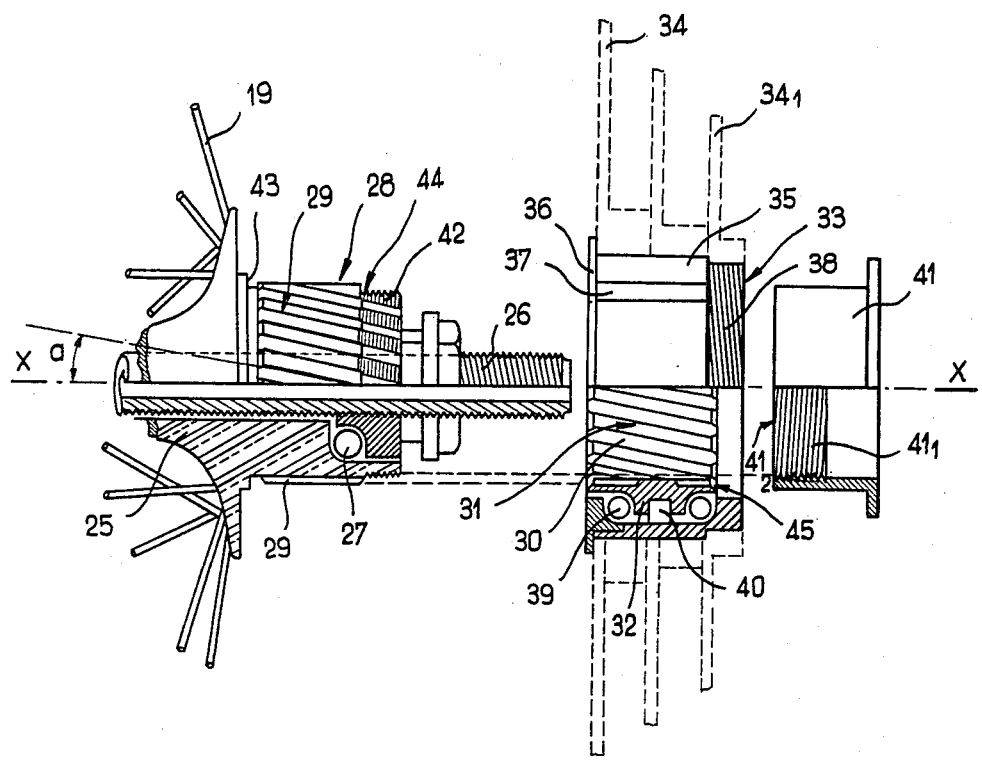
FIG. 3 is an exploded view, half in crosssection, of another embodiment of the invention.

Reference will first be made to FIG. 1 which shows a known freewheel assembly, to supplement the discussion hereinbefore of previous forms of prior-art freewheel assemblies, and the disadvantages thereof. Thus, FIG. 1 shows a freewheel assembly comprising a hub member 1 which is provided with an axial opening 2 and which, on an outward peripheral surface, rotatably carries a gear assembly 3 by means of ball bearing balls 5. A pawl arrangement 4 comprising at least one pawl is provided for producing a unidirectional drive through the freewheel assembly in known manner. The assembly 3 may have one or more gears.

The axial opening 2 in the hub member 1 is provided with an internal screwthread 6 for screwing the freewheel assembly on to a screw-threaded portion of a hub 7 of a cycle wheel.

The screwthread 6 comprises screwthreads which are small in height and fine in pitch, being only slightly inclined and indeed often being virtually perpendicular with respect to the axis of the opening 2 through the hub member 1, so that screwing the hub member of the freewheel assembly on to the hub of the cycle simultaneously results in locking, centering and lateral positioning (ie positioning in the axial direction of the hub 1) of the freewheel assembly on the hub 7 of the cycle wheel. Such a freewheel assembly is often very difficult to remove from the wheel hub because the fine-pitch screwthread 6, after a period of use of the wheel and the freewheel assembly, can easily become so tight on the hub 7 that it is virtually impossible to unscrew the freewheel assembly, even when using the special tools usually provided.

The present invention seeks to avoid this kind of difficulty, by providing a freewheel assembly which while simple and reliable, is quick and easy to fit and to remove, without the need for any special tool, thereby for example to permit the wheel to be cleaned after the freewheel assembly has been removed, or to permit replacement of a broken spoke on the hub flange at the freewheel side, or to permit the gear ratios to be very quickly changed, by replacing one freewheel assembly which carries a certain range of gears, with another freewheel assembly which has gears of different diameters and thus different gear ratios.

Referring therefore now to FIG. 2, the freewheel assembly of the invention comprises a hub member 8 which is provided with an axial opening 9 therethrough. On its outward peripheral surface, the hub member 8 rotatably carries a gear assembly 10 by way of bearing balls 12. At least one pawl 11 is operatively disposed between the gear assembly 10 and the hub member 8, which assembly has one or more gears or pinions 10.

The opening 9 in the hub member 8 includes a generally cylindrical generally smooth-walled portion 13 in which there is a spline means comprising preferably a plurality of ribs and/or grooves as indicated at 14. The splines 14 are slightly inclined or extend longitudinally with respect to the axis XX of the freewheel assembly, ie parallel to axis XX, and are adapted to cooperate with a spline arrangement comprising ribs and/or grooves 16 which correspond in shapes and sizes to the splines 14; the spline arrangement 16 is provided on a portion 17, which has a generally cylindrical surface, of the hub 18 of the wheel, to a flange of which spokes 19 of the wheel are connected.

When the splines 14 and 16 are inclined as aforesaid, the angle of inclination of the splines 14 and 16, taking into account the direction of operation of the pawls 11, is such as to ensure a self-locking action for the freewheel assembly relative to the hub member 18, when the gear assembly 10 is driven by a drive chain, ie the freewheel assembly tends to tighten on to the hub 18, without however becoming fixed on the hub 18.

Provided at the other end, ie the outer end, of the axial opening 9 in the hub member 8, there is also a cylindrical bearing surface 20 in which a ball bearing assembly 21 is housed, the axial opening $21_1$ in the ball bearing assembly 21 corresponding to the diameter of an external shoulder or enlarged-diameter portion $22_1$ formed on the spindle 22 of the hub 18.

Centering and support of the freewheel assembly on the hub 18 of the wheel are therefore effected by cooperation between the ball bearing assembly 21 and the shoulder $22_1$, so that the support and centering action is effected directly in relation to the spindle 22 and not the hub 18.

When the freewheel assembly has thus been fitted without screwing on to the hub 18 and its spindle 22, the freewheel assembly is fixed laterally, ie axially of the spindle 22, by means of a nut 23 which is screwed on to the screwthreaded end portion $22_2$ of the spindle 22. The nut 23 thus bears against the inner track ring of the ball bearing assembly 21, by way of a washer member 24.

Reference will now be made to FIG. 3, which shows a freewheel assembly which is locked on the wheel hub by means of an independent ring which is engaged on to the hub. The ring does not have any connection to the spindle of the wheel so that there is no danger, when locking the freewheel assembly on the wheel hub, that an axial force will be applied to the spindle of the wheel, which axial would have to be completely carried by the ball bearing balls which are disposed between the spindle and the hub of the cycle wheel.

This embodiment also makes it possible for the wheel hub bearing assembly to be moved towards the position at which the wheel spindle is fixed to the carrier lug on the fork of the cycle, in order to avoid an excessive spindle overhang.

In this embodiment, the hub 25 of the cycle wheel, to which the spokes 19 are connected, is mounted rotatably on a screw-threaded spindle 26, by means of ball bearing balls 27.

The hub 25 has a portion providing a cylindrical surface 28 on which there is provided a spline arrangement comprising ribs and/or grooves 29 which are inclined with respect to the axis of the hub. The spline arrangement 29 is intended to receive a spline arrangement comprising ribs or grooves 30, of corresponding shapes, sizes and angle of inclination, which in this embodiment are provided in a cylindrical opening 31 which passes completely through the hub member 32 of the freewheel assembly 33.

In this embodiment, the freewheel assembly 33 comprises a gear assembly 34 formed by a plurality of removable gears which are arranged in succession on a cylindrical body 35, the largest gear bearing against an end flange member 36 on the body 35.

The gear assembly 34 is non-rotatably locked on the cylindrical body 35 by means of internal ribs provided on the gear assembly 34, which ribs are received in longitudinal grooves 37 formed in the peripheral surface of the body 35.

The gears which form the gear assembly 34 and which are arranged on the body 35, are locked for example by the last and smallest gear $34_1$ being screwed on to a screwthreaded portion 38 formed at the end of the body 35 which is remote from the flange member 36.

The body 35 is mounted rotatably on the hub member 32 by means of bearing balls 39, with interposed pawls 40, the angle of inclination of the spline arrangements 29 and 31 being in a direction, taking into account the direction of operation of the pawls 40, that the freewheel assembly 34 tends to be urged further on to the surface 28, when the gear assembly 34 is driven by the cycle drive chain in order to turn the hub 25 of the cycle wheel on its spindle 26.

The angle of inclination of the spline arrangements is such that the freewheel assembly does not have a tendency to become locked on the wheel hub, so that the freewheel assembly can be removed from the wheel hub by simply pulling it outwardly, after having removed the clamping ring 41.

The function of locking the freewheel assembly on the wheel hub 25, so as to prevent relative rotation between the freewheel assembly and the wheel hub 25, by means of the spline arrangements 29 and 31, is disassociated from the function of fixing the freewheel assembly on the hub 25 axially of the hub spindle 26, the axial fixing action being provided by the locking ring 41. For this purpose, the ring 41 is provided with an internal screwthread $41_1$ which is engaged on to a screwthreaded portion 42 on the wheel hub at the free end of the cylindrical portion 28, the portion 42 being of smaller diameter than the portion 28.

In this embodiment, the outside diameter of the ring 41 is slightly greater than the minimum diameter (as determined by the tops of the ribs 30) of the hub member 32, while the length of the hub member 32, over which the ribs 30 extend, is slightly greater than the distance between the flange portion 43 of the wheel hub, against which the hub member 32 of the freewheel assembly bears, and the junction at 44 between the cylindrical portion 28 and the screwthreaded portion 42.

Thus, when the freewheel assembly is fitted on the hub 25 by means of their respective spline arrangements, the hub member 32 of the freewheel assembly comes to bear against the flange portion 43 and screwing the ring 41 on to the screwthreaded portion 42 causes the end face $41_2$ of the ring 41 to bear against the end face 45 of the hub member 32, the end face 45 being at the level of the screwthreaded portion 42.

By slightly tightening the ring 41, the freewheel assembly is axially secured on the wheel hub 25. The ring 41 can be easily removed by hand, as there is no danger of the freewheel assembly suffering from self-locking on the wheel hub 25 under the pulling force applied by the drive chain, as the drive connection between the freewheel assembly and the wheel hub 25 is provided by the ribs and grooves 29 and 31.

In order to improve this effect, the screwthreads 42 and 41, on the hub 25 and the ring 41 respectively, are inclined with respect to the axis X—X, in the opposite direction to the angle of inclination a of the ribs and grooves 29 and 31.

The above-described forms of mounting a freewheel assembly on a cycle wheel thus provide for improved locking, centering and lateral or axial positioning of the freewheel assembly on the cycle wheel hub.

Various modifications may be made in the above-described constructions without thereby departing from the scope and spirit of the invention, and such modifications are thus deemed to be within the scope of the invention.

I claim:

1. A cycle wheel engaged to an integral freewheel assembly, said assembly comprising a hub member with an axial opening therein, a gear means rotatably supported and secured to said hub member, a pawl arrangement operatively disposed between said gear means and said hub member, a spline means in said axial opening, said spline means extending the width of said hub member, said cycle wheel adapted to receive said freewheel assembly, said cycle wheel comprising a rim, a hub, means connecting said rim and said hub, and a spindle on which said hub is rotatably supported, said wheel hub having an external generally cylindrical portion provided with a spline means having a length sufficient to extend across a substantial portion of said axial opening and engage said axial opening spline means whereby said cylindrical portion and cylindrical portion spline means provides uniform support and a rotatable drive for said freewheel assembly, and means for axially securing said freewheel assembly to said hub member whereby disengagement of said securing means permits manual disengagement of said integral freewheel assembly as a unit from said hub member.

2. A cycle wheel engaged to a freewheel assembly and clamping ring, said assembly comprising a hub member with an axial opening therein, a gear means rotatably supported on said hub member, a pawl arrangement operatively disposed between said gear means and said hub member, and a spline means in said axial opening,, said cycle wheel adapted to receive said freewheel assembly, said cycle wheel comprising a rim, a hub, means connecting said rim and said hub, and a spindle on which said hub is rotatably supported, said wheel hub having an external generally cylindrical portion provided with a spline means adapted to cooperate with said spline means in said axial opening of said freewheel assembly and further provided with screwthreads on the free end of said wheel hub, said clamping ring having screwthreads adapted to cooperate with the screwthreads of the wheel hub, the outside diameter of said ring being slightly greater than the minimum diameter of said opening in said hub member of the freewheel assembly.

3. A wheel as set forth in claim 2 wherein the diameter of said cylindrical portion carrying the spline means of said wheel hub is slightly greater than the diameter of the screwthreaded free end of the wheel hub.

4. A cycle wheel as set forth in claim 2 wherein said axial opening spline means and said cylindrical portion spline means extend at a slight angle to the axis of said wheel.

5. A wheel as set forth in claim 4 wherein the screwthread of the free end of the wheel hub has a pitch inclined with respect to the axis of the hub member in the opposite direction to the angle of inclination of said spline means.

6. A wheel as set forth in claim 2 wherein said wheel hub has a bearing flange portion for abutment of a first axial end face of said hub member of the freewheel assembly, and wherein said hub member has a second axial end face at a slightly greater distance from said first end face than the distance between said flange portion of the wheel hub and the junction of said cylindrical and screwthreaded portions of the wheel hub.

* * * * *